United States Patent
Maymudes

(10) Patent No.: US 7,010,361 B2
(45) Date of Patent: Mar. 7, 2006

(54) CLOCK RADIO WITH COMPUTER-BASED REMOTE CONTROL FACILITATOR

(75) Inventor: David M. Maymudes, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/874,083

(22) Filed: Jun. 22, 2004

(65) Prior Publication Data

US 2004/0230330 A1 Nov. 18, 2004

Related U.S. Application Data

(62) Division of application No. 09/524,125, filed on Mar. 13, 2000, now Pat. No. 6,748,278, and a division of application No. 10/629,179, filed on Jul. 28, 2003.

(51) Int. Cl.
*G05B 11/01* (2006.01)

(52) U.S. Cl. ............... 700/16; 700/1; 700/14; 700/15; 700/65; 700/66; 455/186.1; 455/231; 368/10; 368/41; 340/426.18; 340/426.34; 340/539.1; 340/825.69; 364/6; 361/814; 346/37

(58) Field of Classification Search ............ 700/11–16, 700/37, 65–66, 1; 455/186.1, 3.02, 231, 455/344; 725/74; 342/457; 348/552, 734; 340/10.5, 825.98, 426.18, 426.34, 825.69, 340/539.1; 346/37; 361/814; 369/6; 368/10, 368/41
See application file for complete search history.

(56) References Cited

U.S. PATENT DOCUMENTS

| | | |
|---|---|---|
| 4,418,333 A | 11/1983 | Schwarzbach et al. |
| 5,051,720 A | 9/1991 | Kittirustsunetorn |
| 5,086,385 A | 2/1992 | Launey et al. |
| 5,268,666 A | 12/1993 | Michel et al. |
| 5,365,494 A * | 11/1994 | Lynch .................. 368/10 |
| 5,539,478 A * | 7/1996 | Bertram et al. ............. 348/734 |
| 5,629,868 A | 5/1997 | Tessier et al. |
| 5,748,147 A * | 5/1998 | Bickley et al. ............. 342/457 |
| 5,900,867 A * | 5/1999 | Schindler et al. ........... 715/719 |
| 6,223,029 B1 | 4/2001 | Stenman et al. |
| 6,418,324 B1 | 7/2002 | Doviak et al. |
| 6,463,343 B1 * | 10/2002 | Emens et al. .................. 700/83 |
| 6,490,490 B1 * | 12/2002 | Uchikubo et al. ............ 700/65 |
| 6,526,581 B1 * | 2/2003 | Edson .................. 725/74 |
| 6,628,340 B1 * | 9/2003 | Graczyk et al. ............ 348/552 |
| 6,650,877 B1 * | 11/2003 | Tarbouriech et al. ..... 455/186.1 |
| 2001/0005197 A1 * | 6/2001 | Mishra et al. ............... 345/100 |
| 2001/0025349 A1 * | 9/2001 | Sharood et al. ............. 713/340 |
| 2001/0053274 A1 | 12/2001 | Roelofs et al. |
| 2002/0072326 A1 * | 6/2002 | Qureshey et al. .......... 455/3.02 |
| 2003/0101294 A1 | 5/2003 | Saint-Hilaire et al. |
| 2003/0141987 A1 | 7/2003 | Hayes |
| 2003/0161411 A1 | 8/2003 | McCorkle et al. |
| 2003/0189509 A1 | 10/2003 | Hayes et al. |
| 2004/0070491 A1 * | 4/2004 | Huang et al. ............... 340/10.5 |
| 2005/0058144 A1 | 3/2005 | Ayyagari et al. |

* cited by examiner

*Primary Examiner*—Ramesh Patel
(74) *Attorney, Agent, or Firm*—Lee & Hayes, PLLC

(57) ABSTRACT

A clock radio includes a clock a user interface that is dynamically configurable from a remote computer. Once configured, the user interface allows a user to select radio programs that are accessible by the remote computer. When a user selects a radio program via the interface, a signal indicating the selected radio program is transmitted from the clock radio to the remote computer. The remote computer then accesses the selected radio program and transmits the selected radio program to speaker(s) for broadcast.

26 Claims, 5 Drawing Sheets

CLOCK RADIO WITH COMPUTER-BASED REMOTE CONTROL FACILITATOR

RELATED APPLICATIONS

This application is a divisional of a U.S. patent application entitled "Remote Controlled System With Computer-Based Remote Control Facilitator," Ser. No. 10/629,179, by inventor David M. Maymudes, filed Jul. 28, 2003, which in turn is a divisional of U.S. Pat. No. 6,748,278, entitled "Remote Controlled System With Computer-Based Remote Control Facilitator," by inventor David M. Maymudes, issued Jun. 8, 2004, each of which are hereby incorporated herein by reference.

BACKGROUND

Remote controlled systems have been around for many years. People are familiar with remote controlled televisions, stereos, VCRs (video cassette recorders), and other such commercial products.

FIG. 1 shows a traditional remote control system 100 having a remote controller 102 that is specially configured to control exactly one associated controlled device 104. The dedicated remote controller 102 uses proprietary communication schemes to transmit signals via a wireless link 108 (e.g., infrared, RF) directly to the controlled device 104. For instance, a television remote controller is designed with dedicated buttons to control one associated television by sending proprietary channel up/down signals, volume control signals, and so forth, in response to user activation of the buttons. Due to the proprietary nature, the television remote controller cannot be used to control other devices, such as a stereo system or VCR.

Universal remote controllers make it possible to control more than one device. Universal remote controllers have generic user interfaces, such as a numeric keypad, control buttons, and a multi-positional actuator pad, which can be used to control several devices like a television, VCR, and set top box. Unfortunately, universal remote controls are complicated, often difficult to program, and hence, are not always very flexible.

Accordingly, there remains a need for improved remote controlled systems that enable inexpensive controllers to control multiple different devices without the hassles of pre-programming such controllers.

SUMMARY

A remote controlled system employs a computer-based remote control facilitator to facilitate remote control of a controlled device from a non-dedicated remote controller. The computer facilitator is coupled to the remote controller and controlled device via a wireless or wire-based network. Neither the remote controller nor the controlled device need have any awareness of the other, or any knowledge as to how to communicate with one another. In fact, both devices can be completely unrelated to one another, particularly in terms of what a user would perceive as their primary or intended use. For instance, the remote controller may be a cell phone and the controlled device might be a television or stereo. More generally, the remote controlled system allows any device with some form of user interface to control, via the computer-based facilitator, any other device.

In the described implementation, the computer facilitator is a general-purpose computer that runs an open platform operating system. The computer facilitator executes a software application that corresponds to the controlled device. The application contains program code, data, information, and any other intelligence that may be used by the computer facilitator to assist the remote controller in controlling the controlled device.

During operation, the computer facilitator senses that a remote controller is nearby. As one example, the facilitator, remote controller, and controlled device are compatible with the universal plug and play (UPnP) architecture. With UPnP, the facilitator can learn the existence of potential devices as well as the information (an IP address) needed establish TCP/IP connections to them. The remote controller provides a description of its capabilities and components and this description is stored as schema at the facilitator.

From the schema, the computer facilitator chooses an appropriate user interface based on the physical properties of the remote control device and on the device to be controlled. The UI provides options to the user, and allows the user to select a desired option. This selection is returned to the computer facilitator. The remote controller has no inherent or pre-configured knowledge of the controlled device, or any way to control it. The remote controller simply presents the options received from the computer facilitator and returns the user's choice.

The application running at the computer facilitator translates the user's selection into a command that is sent to the controlled device. The command directs the controlled device to perform an action related to the option selected by the user.

The remote controlled system is very beneficial in that an inexpensive remote controller can be used to control many unrelated devices in homes and offices. The remote controller need not be tied to a specific brand or model of controlled device nor understand what it is doing; rather, the remote controller gains its power and flexibility from the general-purpose computer.

In fact, the remote controller may be a device that one would not expect to be used for controlling other devices. For instance, the remote controller may be implemented as a cell phone with an LCD display and numeric keypad. This cell phone may be controlled by the computer facilitator to present menus used to control a living room stereo system. The cell phone does not have to know anything about music playback, but simply shows on its screen the menus provided by the computer. The cell phone reports the button presses back to the computer without any knowledge of what those presses mean.

Another specific implementation of the remote controlled system is a clock radio. In this implementation, the clock radio consists of a clock/UI, one or more speakers, and a general-purpose computer that facilitates remote control of the speakers from the clock/UI.

DETAILED DESCRIPTION

This invention concerns a remote controlled system having a computer-based remote control facilitator that facilitates remote control of a controlled device from a non-dedicated remote controller. For discussion purposes, the computer-based remote control facilitator is described in the context of a personal computer, although other computer form factors or computing devices may be used. In addition, the remote controller and controlled device are configured using technology conforming to the Universal Plug and Play (UPnP) architecture, which is an architecture for pervasive peer-to-peer network connectivity of PCs of all form factors, intelligent appliances, and wireless devices. UPnP is a distributed, open networking architecture that leverages TCP/IP and the Web to enable seamless proximity networking in addition to control and data transfer among networked devices in the home, office, and everywhere in between. However, it is noted that other networking architectures may be employed.

Basic System

Figure 1:
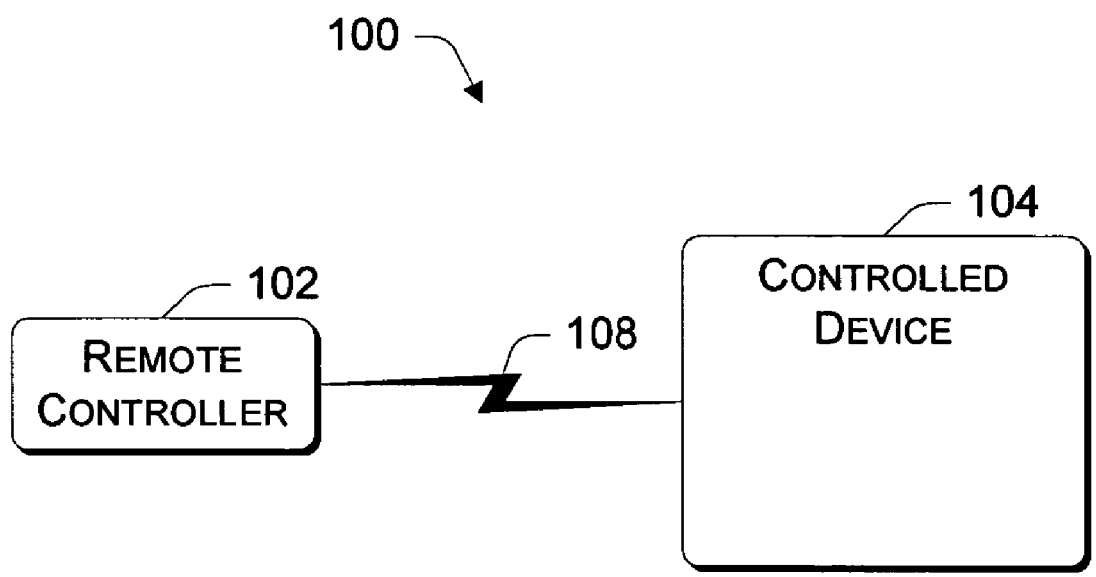
FIG. 1 is a block diagram of a prior art remote controlled system.
Figure 2:
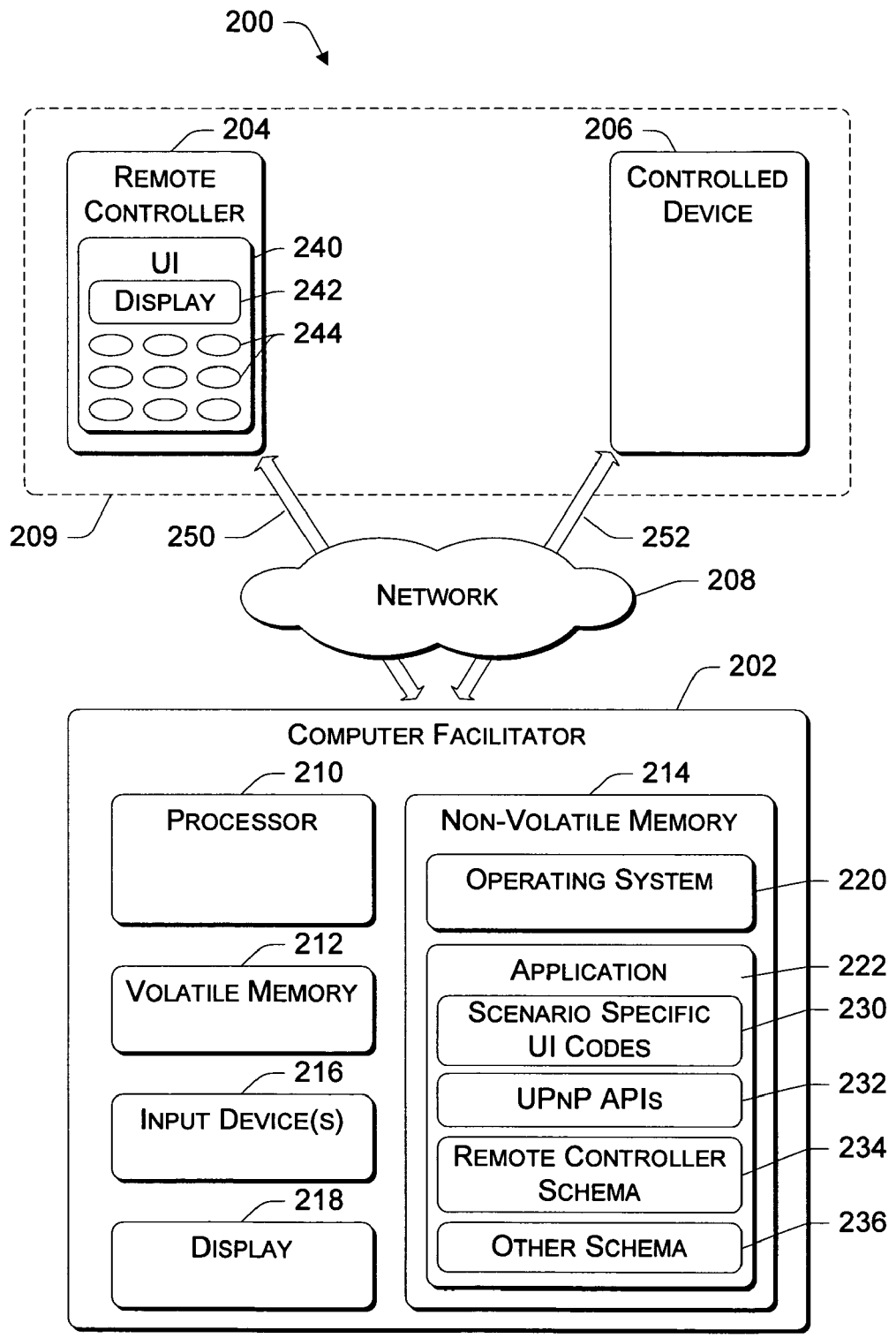
FIG. 2 is a block diagram of a remote controlled system having a computer-based remote control facilitator.

FIG. 2 shows a remote controlled system 200 having a computer-based remote control facilitator 202, a remote controller 204, and a controlled device 206. The computer-based remote control facilitator 202 is coupled to the remote controller 204 and controlled device 206 via a network 208, which may be implemented as a wireless network (e.g., IR, RF, etc.) and/or a wire network (e.g., LAN). In the described implementation, the network 208 supports the TCP/IP communication protocol among the participants 202–206. An example of one suitable close-proximity wireless network protocol is the BlueTooth wireless network protocol, which is known to those of skill in the art. For more information on the BlueTooth protocol, the reader is directed to the Web site "bluetooth.com".

The computer-based remote control facilitator 202 is configured to assist the remote controller 204 in controlling the controlled device 206. The remote controller 204 may be embodied in a way that resembles a common remote controller, such as familiar controllers for televisions, VCRs, stereos, or set top boxes. Alternatively, the remote controller 204 may be implemented as some other useful device that may be utilized temporarily to control another device.

Neither the remote controller 204 nor the controlled device 206 need have any awareness of the other, or any knowledge as to how to communicate with one another. In fact, both devices can be completely unrelated to one another, particularly in terms of what a user would perceive as their primary or intended uses. For instance, the remote controller 204 may be a cell phone and the controlled device 206 might be a television or stereo. A user would not expect to use a cell phone to control a television, but this type of situation can be accomplished by the remote controlled system 200. In essence, any device with some form of user interface can be used to control, via the computer-based facilitator, any other device. This architecture is explored below in more detail with reference to FIG. 4.

It is further noted that the remote controller 204 and the controlled device may be implemented as an integrated unit, as indicated by the dashed box 209, although the facilitator 202 supports communication between the controller 204 and controlled device 206. For instance, the remote controller 204 may be a UI and the controlled device 206 may be speakers within the same physical box.

The remote control facilitator 202 essentially controls both the remote controller 204 and the controlled device 206. The facilitator 202 provides information to the remote controller 204 that is presented to a user to enable the user to enter control data for controlling the controlled device 206. The facilitator 202 receives the control data from the remote controller 204 and translates that data into commands that are sent to the controlled device 206 to effectuate the action intended by the user.

The computer-based remote control facilitator 202 is illustrated as a general-purpose computer having a processor 210, volatile memory 212 (e.g., RAM), and non-volatile memory 214 (e.g., ROM, Flash, hard disk, floppy disk, CD-ROM, etc.). The facilitator 202 may also have one or more input devices 216 (e.g., keyboard, mouse, microphone, stylus, etc.) and a display 218 (e.g., monitor, LCD, etc.). The facilitator 202 is representative of many diverse types of computing devices, including desktop computers, laptops, set-top boxes, information appliances, and so forth.

The remote control facilitator 202 runs an operating system 220 and one or more application programs 222. The operating system 220 is preferably an open platform, multitasking operating system, such as a Windows-brand operating system from Microsoft Corporation. The application program 222 is an application associated that supports remote control of the controlled device 206 from the non-dedicated remote controller 204. The controlled device (CD) application 222 is loaded onto the computer facilitator 202 during initial installation and configuration of the controlled device. For example, when the user purchases a new controlled device (e.g., stereo or television), the manufacturer of the controlled device provides the software application 222 that may be loaded onto the computer facilitator 202.

For purposes of illustration, operating system 220 and application 222 are illustrated as discrete blocks stored in the non-volatile memory 214, although it is recognized that such programs and components reside at various times in different storage components of the facilitator 202 and are executed by the processor 210. Generally, these software components are stored in non-volatile memory 214 and from there, are loaded at least partially into the volatile main memory 212 for execution on the processor 210.

The controlled device application 222 contains program code, data, information, and any other intelligence that may be used by the facilitator 202 to assist the remote controller 204 in controlling the controlled device 206. The CD application 222 includes scenario-specific UI codes 230 that is passed to the remote controller 204. The UI codes 230 are specific to the scenario of controlling the controlled device 206. That is, the UI codes 230 are tailored to, or associated with, commands understood by the controlled device 206 to effectuate some action at the controlled device.

The CD application 222 also exposes a set of UPnP APIs (application program interfaces) 232. The APIs 232 are conventional to the UPnP architecture, and are known to the skilled artisan. For a more detailed discussion of the UPnP APIs, the reader is directed to "upnp.org", a Web site for the forum governing universal plug and play. One suitable specification available at this site as well as from the Microsoft Web site, "Microsoft.com", is entitled "Universal Plug and Play Device Architecture Reference Specification," Version 0.90-Nov. 10, 1999, which is hereby incorporated by reference.

Of particular interest, the UPnP architecture defines the terms "User Control Point" (UCP) and "Controlled Device" (CD). Normally, anything the user interacts with directly is assumed to be a UCP. Such UCP devices are responsible for discovering controlled devices and rendering UI in HTML (or some other fashion) to allow the user to control the devices. For instance, when the user pushes a button, the device with the button tells the Controlled Device what it should do.

In the remote controlled system 200, the remote controller 204 is not a UCP device, meaning that it does not initiate any action itself, but is instead merely a "controlled device". The computer-based remote control facilitator 202 acts indirectly as the UCP that controls both the remote controller 204 and the controlled device 206. Accordingly, the UPnP APIs 232 are implemented at the facilitator 202 to provide an interface through which the remote controller 204 and controlled device 206 may communicate.

The CD application 222 further maintains schema 234 related to the remote controller, as well as any other schema 236. The facilitator 202 uses the UPnP protocol to discover the schema of the remote controller 204. The remote controller schema 234 contains a description of the user interface at the remote controller 204.

Notice in FIG. 2 that the remote controller 204 provides a user interface (UI) 240 that allows a user to enter control data for controlling the controlled device 206. The UI 240 may be implemented to include any number of different components, including one or more buttons, multi-positional actuator pads, display screen, touch pad, touch screen, speaker, microphone, and the like. The remote control schema 234 describes the types of components and commands that the remote controller 204 can support.

In the illustrated implementation, the UI 240 has a display 242 that is capable of displaying one or more lines of alphanumeric characters and/or a bitmap display that is capable of displaying characters and rudimentary symbols/graphics. The UI 240 also has one or more input buttons 244 that allow the user to select options presented on the display 242. The schema 234 describes the type of display 242, the kind of data it can display (e.g., text strings, graphics, etc.), and the number and type of actuatable buttons 244.

Operation

Figure 3:
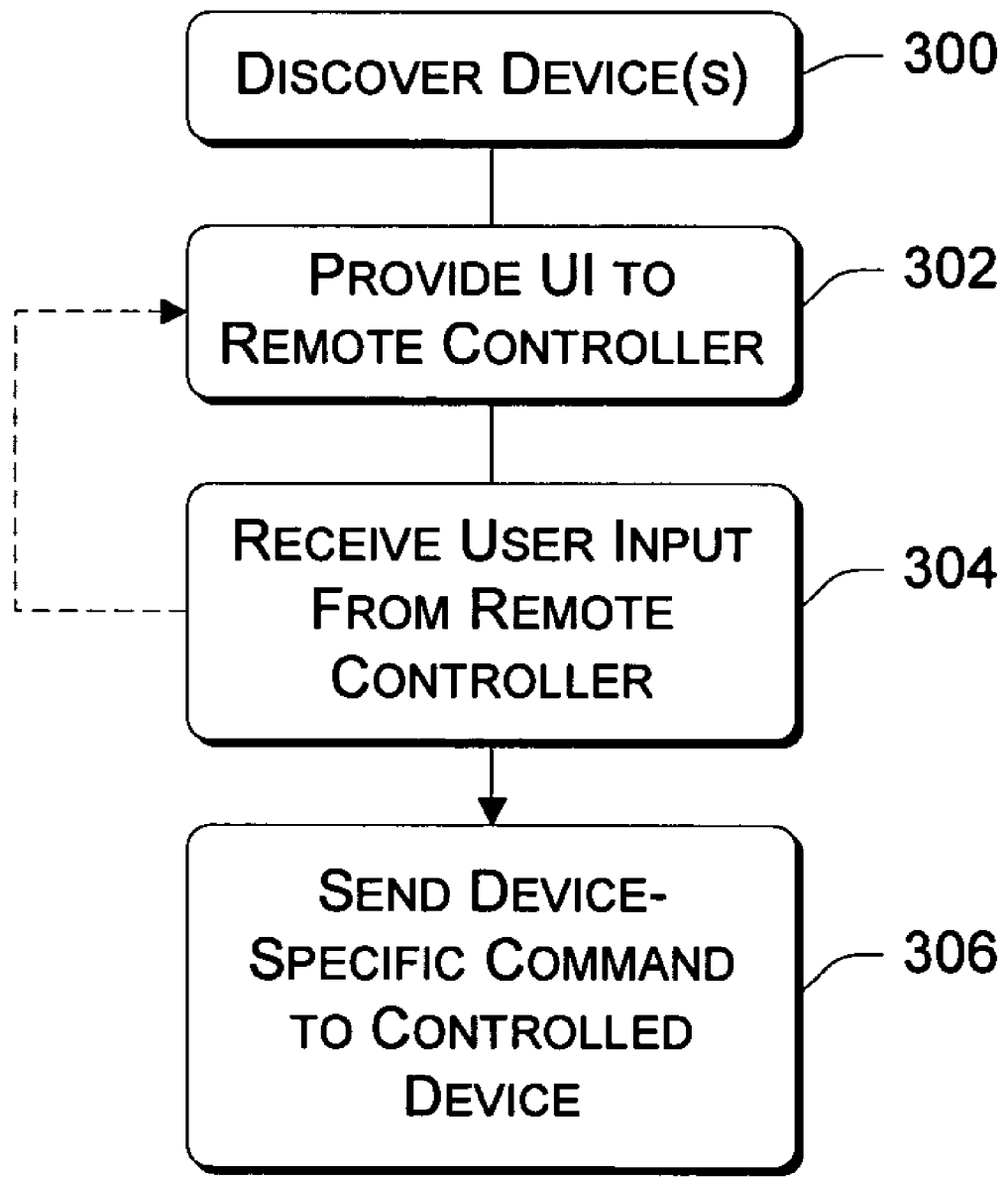
FIG. 3 is a flow diagram of a process for facilitating remote control of a controlled device from a remote controller.

FIG. 3 shows a process for facilitating remote control of a controlled device from a remote controller. The process is implemented at the computer-based remote control facilitator 202 and will be described with additional reference to FIG. 2. To assist in describing the method, assume that the remote controller 204 is implemented as a cellular phone having a four-line LCD display and seventeen buttons.

At step 300, the computer facilitator 202 senses that the remote controller 204 and the controlled device 206 are nearby. For instance, the facilitator 202 may employ the discovery techniques defined by the universal plug and play architecture. More specifically, in one implementation, the system 200 employs Simple Service Discovery Protocol (SSDP), a simple network device discovery protocol used by UPnP to allow facilitator 202 to learn of the existence of potential peer devices, such as remote controller 204 and controlled device 206, as well as the information (an IP address) needed to establish TCP/IP connections to them. In response to an SSDP search, UPnP devices, such as the remote controller 204 and the controlled device 206, return a description Uniform Resource Locator (URL) in the SSDP Location and optionally the Alternate Location (AL) SSDP headers. A successful result of an SSDP search is a URL, which can be resolved to an IP address for making a connection to the discovered device. SSDP is described in more detail in the above-referenced specification "Universal Plug and Play Device Architecture Reference Specification," Version 0.90.

As part of the discovery, the remote controller 204 provides a description of its capabilities and components. The description is stored as the remote controller schema 234 at the facilitator 202. Any other schema learned from the controlled device 206, is also stored at the facilitator 202 as other schema 236.

At step 302, the computer facilitator 202 provides UI codes 230 to the remote controller 204 over a link 250 of the network 208. The codes are transmitted using UPnP over the link 250, which may be wireless or wire-based. The UI codes 230 are related to the configuration and makeup of the remote controller as described in the remote control schema 234. In this manner, the codes 230 become associated with the components (e.g., buttons, display screen, i etc.) on the remote controller 204, even though such components would not normally be used to provide such control.

The UI codes 230 include text strings that may be displayed on a display of the UI 240. As an example, once the computer facilitator discovered the cell phone 204, the facilitator 202 may instruct the phone to display a top-level menu of services that could be controlled by the phone, perhaps something like the following four text strings:
1. Music
2. Video
3. Lights
4. Other The codes supporting the menu UI are associated the first four buttons on the phones numeric keypad. When the user presses the "1" button on the phone, the phone 204 fires a UPnP event indicating that the "1" button has been pressed, and this event is transferred back to the computer via link 250.

At step 304, the computer facilitator 202 receives the event from the remote controller 204 and acts on it. Depending upon the event, the facilitator 202 may return another set of UI codes that are more specific to one or more controlled devices 206. This is represented by the dashed return path from step 304 to step 302. In this example, the user selected "Music" by pressing the "1" button. The computer facilitator 202 sends new strings for the phone to display that pertain to the selected "Music" option, such as:
1. Random Music from your Collection
2. Background Music
3. KUOW 94.9
4. Choose Album Eventually, at step 306, the facilitator 202 receives an event that is intended to control the controlled device 206. The application 222 translates the event returned from the remote controller 204 into a command that is sent via link 252 of network 208 to the controlled device 206 to effectuate the action intended by the user. For instance, suppose the user hits the "3" button on the Music menu. In one scenario, assuming that KUOW 94.9 is a local station, the computer facilitator 202 receives this event and converts it to a command instructing a stereo (i.e., controlled device 206) to tune to the FM radio station KUOW 94.9.

In another scenario, assuming that KUOW 94.9 is not a local radio station, the computer facilitator translates the event to a command to connect to an audio feed on the Internet and to route the audio output to a set of UPnP speakers. Here, the speakers are the controlled device 206, rather than the stereo.

The remote controlled system 200 is very flexible in that it essentially allows any controlled device with some form of UI to control essentially any other controlled device, assuming there is an application resident on the computer facilitator to support such control. Remember, in the above example, the phone has no inherent or pre-configured knowledge of the stereo or Internet link, or any way to control it. The phone is simply displaying a list of text strings provided by the computer facilitator and returning button presses entered by the user.

The flexibility makes it easier for a user to modify their system architecture. If the user acquires a new controlled device, he/she can upgrade or re-configure the software running on his/her PC, rather than having to upgrade the firmware on the cellular phone in order to control it. Modifying the software is substantially easier due to the much richer programming environment.

System With Multiple Controlled Devices

Figure 4:
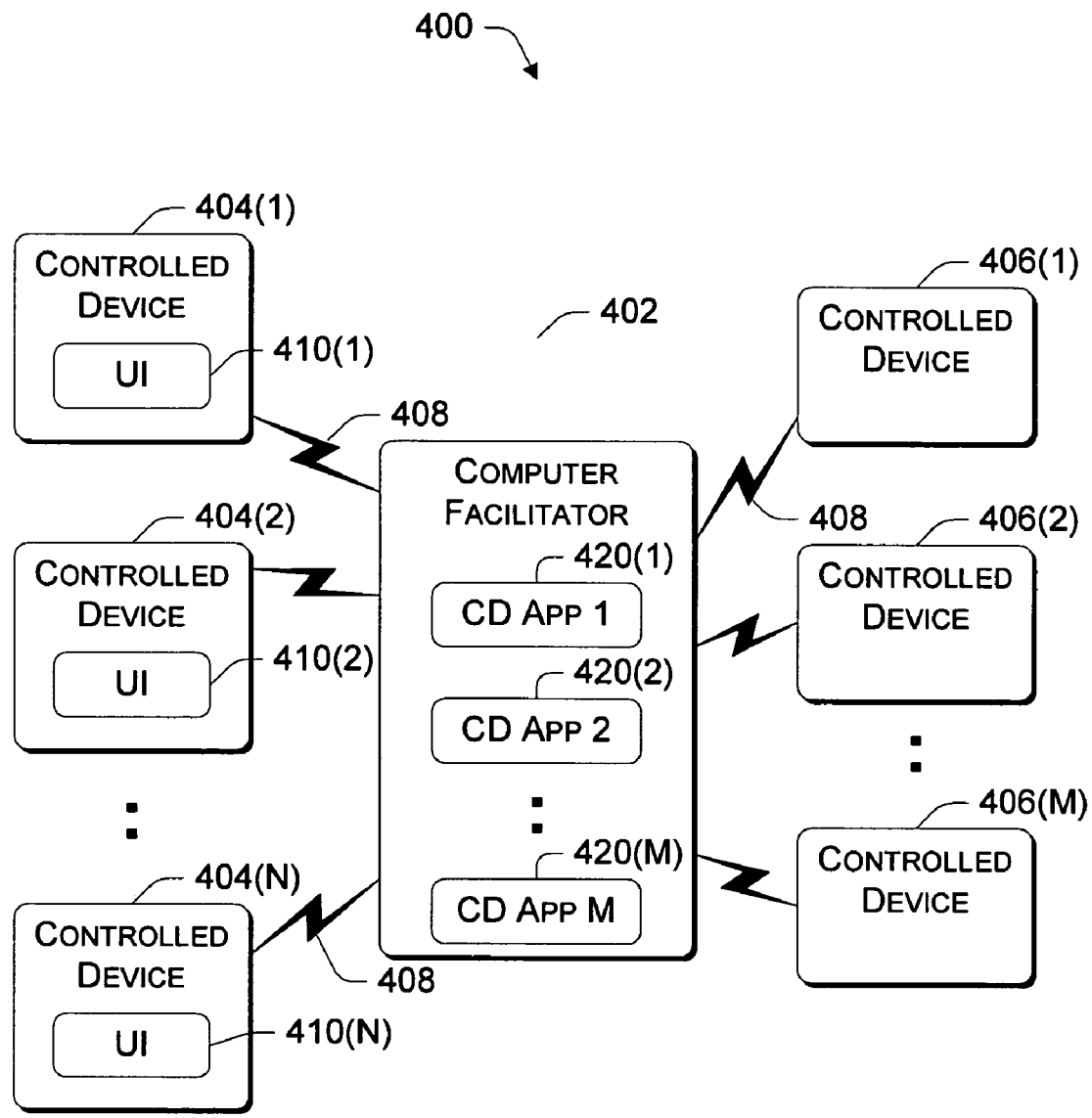
FIG. 4 is a block diagram of the remote controlled system with multiple controlled devices, some of which may be employed as remote controllers.

FIG. 4 illustrates a remote controlled system 400 in which the computer facilitator 402 supports multiple controlled devices 404(1)–404(N) and 406(1)–406(M). The computer facilitator 402 communicates with each of the controlled devices 404 and 406 via IP links 408, such as wireless links or physical wire links. The computer facilitator 402 and controlled devices 404 and 406 support universal plug and play. In the context of a UPnP implementation, the computer facilitator operates as the "User Control Point" and the devices 404 and 406 operate as the "Controlled Devices".

One type of controlled devices referenced by numbers 404(1)–404(N) represents devices that may be utilized as the remote controller 204 in FIG. 2. These controlled devices have a user interface (UI) 410(1)–410(N) that may present a set of options to the user and receive the user selections. The UI-based controlled devices 404(1)–404(N) need not have any knowledge of the options, or how the selections made by the user effectuate actions at the computer facilitator 402 or any one of the controlled devices 406. Indeed, the UI-based controlled devices 404(1)–404(N) may be representative of cellular phones, portable handheld computers, personal digital assistants, or any device that has a display and input keys that may be used by the computer facilitator to present a user with options to control another device.

The second type of controlled devices referenced by numbers 406(1)–406(M) represents devices that are not utilized as the remote controller 204 of FIG. 2. The controlled devices 406(1)–406(M) may be any device that is communicatively coupled to the computer facilitator 402 (e.g., e.g., UPnP-compatible devices) and can be controlled to perform some function. Examples of controlled devices 406(1)–406(M) include televisions, stereos, VCRs, speakers, microwave ovens, lights, alarms, and so forth.

It is noted that the UI-based controlled devices 404(1)–404(N) may themselves be controlled devices. That is, FIG. 4 illustrates two types of controlled devices, but the illustration is not intended to suggest that only UI-based controlled devices control non-UI-based controlled devices. Rather, one UI-based controlled device can conceptually control another UI-based controlled device.

The computer facilitator 402 is implemented as facilitator 202 described in FIG. 2. It includes a controlled device application 420(1)–420(M) for each of the controlled devices 406(1)–406(M) that are being controlled. When a controlled device is detected as being nearby, the computer facilitator 202 discovers the device's capabilities and whether it has a UI. If a UI is present, the computer facilitator 202 stores the schema of the UI-based controlled device in association with one or more of the applications 420.

To facilitate control of a controlled device from a UI-based controlled device, the computer facilitator 402 chooses an appropriate set of UI codes to send to the UI-based controlled device based on the physical properties of the remote control device and on the set of devices to be controlled. For instance, the UI-based controlled device may have a four-line LCD display and numeric keypad. The UI codes contain menus for the LCD display, and associate options in those menus with the keys of the numeric keypad. Upon receiving user input from the UI-based controlled device, the computer facilitator 402 converts the button selection to a command that initiates performance of an action at the facilitator or the controlled device.

Clock Radio

Figure 5:
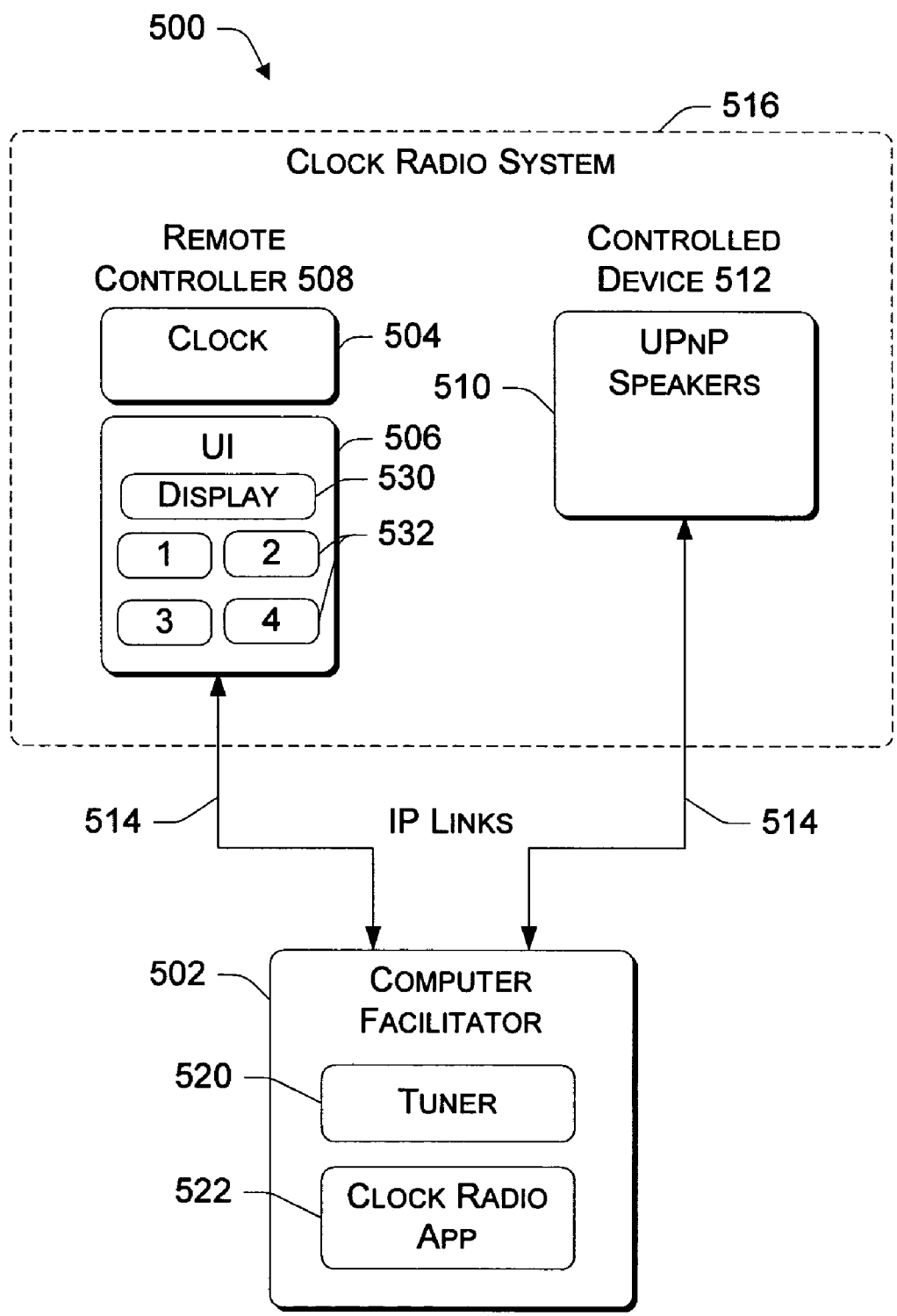
FIG. 5 is a block diagram of the remote controlled system configured as a clock radio.

FIG. 5 illustrates one specific implementation of the remote controlled system 200, where it is embodied as a clock radio 500. The clock radio 500 has a computer facilitator 502, a clock 504 and UI 506 that form a remote controller 508, and one or more speakers 510 that form the controlled device 512. The computer facilitator 502 communicates with both the clock/UI and the speakers via IP links 514, which may or may not be wireless. The clock 504, UI 506, and speakers 510 may be integrated in the same physical housing, as represented by the dashed box 516, or separately from one another.

The clock 504 maintains time-of-day to provide the basic clock function of the clock radio 500. Although less preferred, the clock may alternatively reside at the computer facilitator 502 and the time is periodically sent to the UI 506.

The computer facilitator 502 is a general-purpose computer that is equipped with a tuner 520 for tuning to an audio feed. The tuner 520 may be implemented in many ways. For instance, it may be an RF tuner to receive RF signals carrying the audio data. Alternatively, the tuner 520 may be implemented as a cable tuner for selecting an appropriate cable channel that carries audio data. Another alternative is for the tuner 520 to be implemented as a browser that downloads audio data from a music Web site.

The computer facilitator 502 also has a clock radio application 522 that supports communication between the clock/UI and the speakers. The clock radio application 522 contains the UI codes for enabling a user to select a desired radio program, the UPnP APIs to support communication with the clock/UI and speakers, and the schema describing the UI 506. In the illustrated implementation, the schema describes the UI 506 as having an LCD display 530 to display text strings and four buttons 532 to receive user input.

The computer facilitator 502 provides the UI codes to the UI 506 to enable a user to select a radio station. The options are displayed on the LCD display 530 and associated with the buttons 532. When the user presses a button 532 to make a selection, a UPnP event is triggered and transmitted back to the computer facilitator 502. The button press is converted to a command that directs the tuner 520 to tune to the desired station and to output the audio feed to the speakers 510.

Conclusion

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A clock radio comprising:
   a clock;
   a user interface (UI) to enable user input;
   one or more speakers; and
   a general-purpose computer, remotely located from but communicatively coupled via a packet communications network to the UI and speakers, to facilitate remote control of the speakers by the UI.

2. A clock radio of claim 1, wherein the clock, the UI, and the speakers are integrated in a common housing.

3. A clock radio of claim 1, wherein the general-purpose computer runs an open platform operating system.

4. A clock radio of claim 1, wherein the general-purpose computer is configured to expose a universal plug and play (UPnP) application program interface (API) through which the UI and the speakers may make calls to the general-purpose computer.

5. A clock radio of claim 1, wherein the general-purpose computer is configured to communicate with the UI and the speakers using a wireless communication protocol.

6. A clock radio comprising:
a clock;
a user interface (UI) that is dynamically configurable from a remotely located computer, to enable a user to select an audio feed on a tuner associated with the remotely located computer; and
one or more speakers that receive the user selected audio feed from the remotely located computer.

7. A clock radio as recited in claim 6, wherein the UI is dynamically configurable using a universal plug and play (UPnP) application program interface (API).

8. A clock radio as recited in claim 6, wherein the user interface (UI) and speakers of the clock radio are communicatively coupled to the remotely located computer via one or more wireless packet communications networks.

9. A clock radio as recited in claim 6, wherein the user interface (UI) is dynamically configured based on a schema received from the remotely located computer.

10. A system comprising:
a clock radio including a user interface and one or more speakers; and
a general-purpose computer configured to provide a communication interface through which the user interface and the one or more speakers communicate, wherein the general-purpose computer is remotely located from the clock radio and communicatively coupled via internet protocol (IP) links to the user interface and the one or more speakers of the clock radio.

11. A system of claim 10, wherein the general-purpose computer is configured to expose a universal plug and play (UPnP) application programming interface (API) through which the user interface and the speakers may make calls to the general-purpose computer.

12. A system of claim 11, wherein the clock radio transmits a universal plug and play (UPnP) event to the general-purpose computer in response to a user interaction with the user interface (UI).

13. A system of claim 11, wherein the general-purpose computer is configured to act indirectly as a universal plug and play (UPnP) user control point that controls both the user interface (UI) and the one or more speakers.

14. A system of claim 11, wherein the user interface (UI) is dynamically configurable using the universal plug and play (UPnP) application programming interface (API).

15. A system of claim 14, wherein the user interface (UI) is dynamically configured based on information in a schema contained in the general-purpose computer.

16. A system of claim 15, wherein the schema is based on user interface (UI) device data describing the user interface (UI).

17. A system of claim 14, wherein the user interface (UI) is dynamically configured based on a configuration and makeup of the user interface (UI) and based on control of the one or more speakers.

18. A system of claim 17, wherein the user interface (UI) is further dynamically configured based on the user interaction with the user interface (UI).

19. A system of claim 10, wherein the clock radio further includes a clock to maintain time-of-day and provide the basic clock function of the clock radio.

20. A system of claim 10, wherein the general-purpose computer provides the basic clock function of the clock radio and the time-of-day is periodically sent to the user interface.

21. A system of claim 10, wherein the general-purpose computer is equipped with a tuner for tuning to an audio feed.

22. A system of claim 21, wherein the tuner comprises a browser that downloads audio data from a music web site.

23. A system of claim 21, wherein the timer comprises an RF tuner to receive RF signals that carry audio data.

24. A system of claim 21, wherein the tuner comprises a cable tuner for selecting an appropriate cable channel that carries audio data.

25. A system of claim 10, wherein the IP links are wireless links.

26. A system of claim 10, wherein the IP links are infrared links.

* * * * *

UNITED STATES PATENT AND TRADEMARK OFFICE
CERTIFICATE OF CORRECTION

| | | |
|---|---|---|
| PATENT NO. | : 7,010,361 B2 | Page 1 of 1 |
| APPLICATION NO. | : 10/874083 | |
| DATED | : March 7, 2006 | |
| INVENTOR(S) | : David M. Maymudes | |

It is certified that error appears in the above-identified patent and that said Letters Patent is hereby corrected as shown below:

In column 6, line 12, after "screen," delete "i".

In column 7, line 42, after "e.g.," delete "e.g.,". (Second Occurrence)

In column 9, line 16, in Claim 6, after "computer" delete ",".

In column 10, line 38, in Claim 23, delete "timer" and insert -- tuner --, therefor.

Signed and Sealed this

Eighteenth Day of August, 2009

David J. Kappos
*Director of the United States Patent and Trademark Office*